(12) United States Patent
Steijer et al.

(10) Patent No.: US 7,978,940 B2
(45) Date of Patent: Jul. 12, 2011

(54) SELF-ALIGNED CARRIER ASSEMBLY FOR OPTICAL DEVICE SUPPORTING WAFER SCALE METHODS

(75) Inventors: Odd Robert Steijer, Bromma (SE); Hans Magnus Emil Andersson, Järfälla (SE)

(73) Assignee: Tyco Electronics Services GmbH (CH)

( * ) Notice: Subject to any disclaimer, the term of this patent is extended or adjusted under 35 U.S.C. 154(b) by 0 days.

(21) Appl. No.: 12/558,645

(22) Filed: Sep. 14, 2009

(65) Prior Publication Data

US 2011/0064363 A1    Mar. 17, 2011

(51) Int. Cl.
G02B 6/36 (2006.01)
G02B 6/12 (2006.01)

(52) U.S. Cl. .............. 385/14; 385/49; 385/52; 385/88

(58) Field of Classification Search ............. 385/14, 385/39, 49, 52, 88
See application file for complete search history.

(56) References Cited

U.S. PATENT DOCUMENTS

| | | | |
|---|---|---|---|
| 6,154,370 A * | 11/2000 | Degani et al. | 361/761 |
| 6,297,551 B1 * | 10/2001 | Dudderar et al. | 257/723 |
| 6,396,116 B1 * | 5/2002 | Kelly et al. | 257/432 |
| 6,897,485 B2 * | 5/2005 | Kropp | 257/80 |
| 7,239,767 B2 * | 7/2007 | Kim et al. | 385/14 |
| 7,433,554 B2 * | 10/2008 | Warashina et al. | 385/14 |
| 7,539,366 B1 * | 5/2009 | Baks et al. | 385/14 |
| 7,724,992 B2 * | 5/2010 | Sutherland | 385/15 |

* cited by examiner

*Primary Examiner* — Daniel Petkovsek
(74) *Attorney, Agent, or Firm* — Laubscher & Laubscher, P.C.

(57) ABSTRACT

Broadly speaking, disclosed is a carrier assembly for an optical device, the carrier assembly comprising in combination: a glass substrate with an optical die thereon; and a silicon carrier attached to the glass carrier. During manufacture, a number of optical dies can be attached on the glass substrate using self-alignment of AuSn solder bumps using gaseous flux at about 300 deg C. The glass carrier can be mounted to the silicon carrier to form an optical device carrier assembly comprising micromechanical guide holes to facilitate a optical fiber connection, using self-alignment of SnAg solder bumps using gaseous flux at about 250 deg C. Each individual optical device can be tested at a wafer scale. The resulting optical device assembly can be diced to form individual optical devices having a carrier assembly that exhibits the traits of both a silicon carrier and a glass carrier.

9 Claims, 11 Drawing Sheets

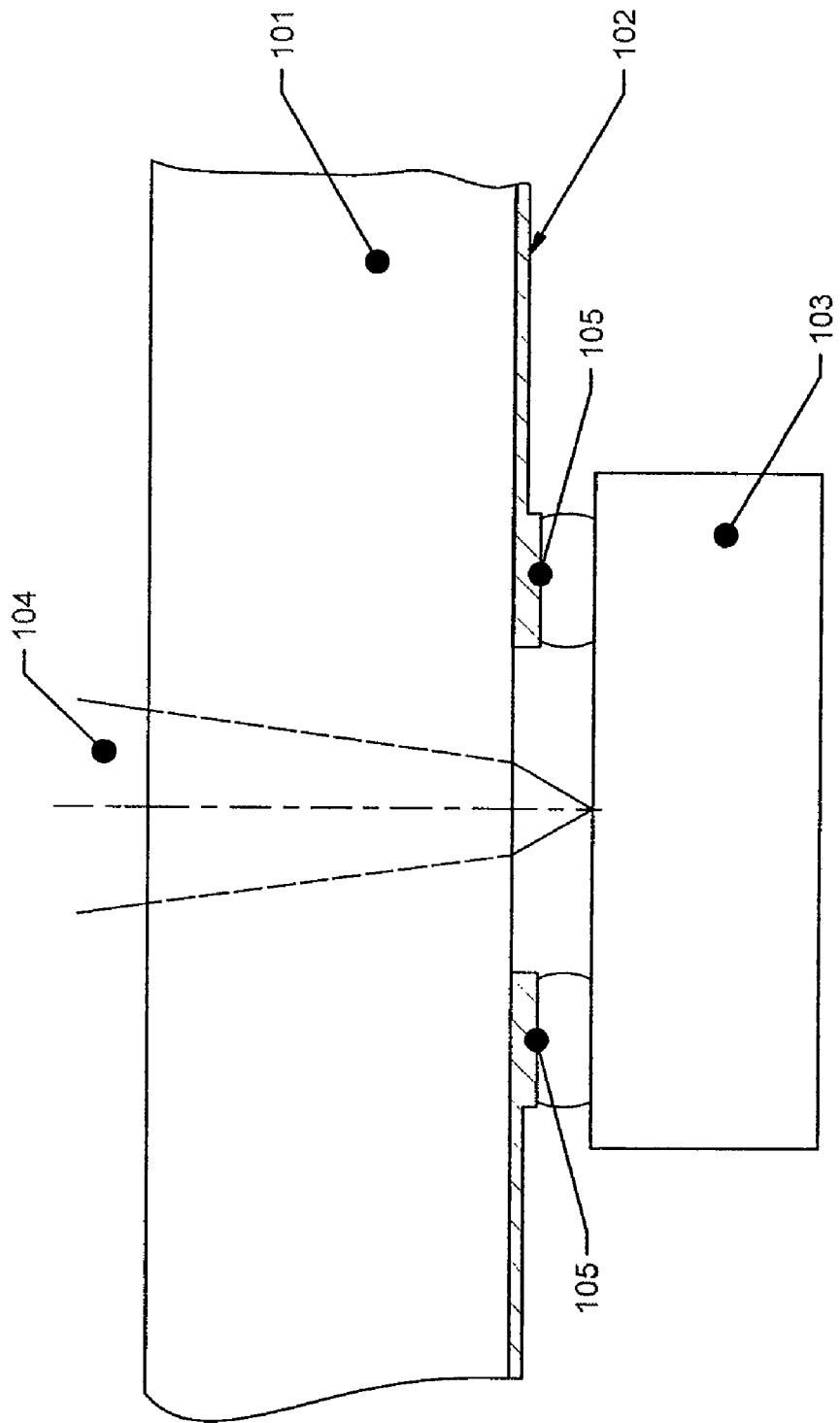
FIG.1 - PRIOR ART

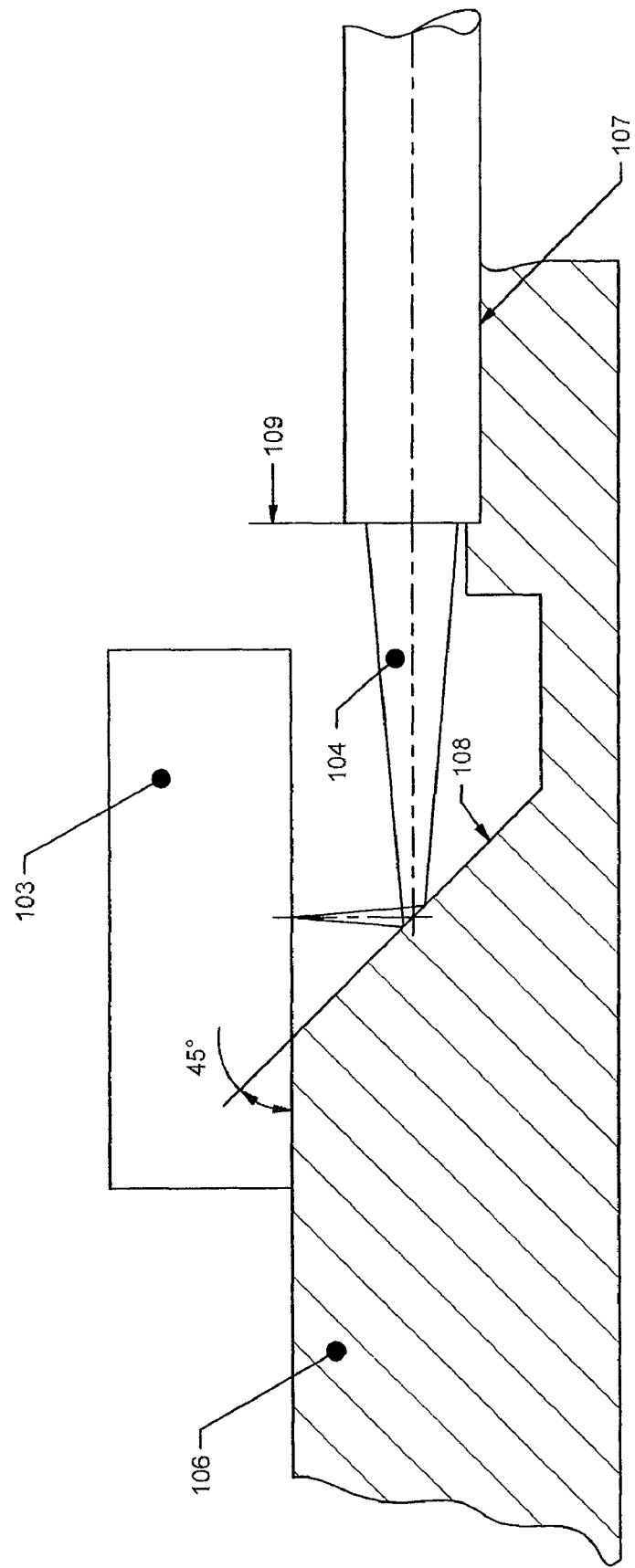
FIG.2 - PRIOR ART

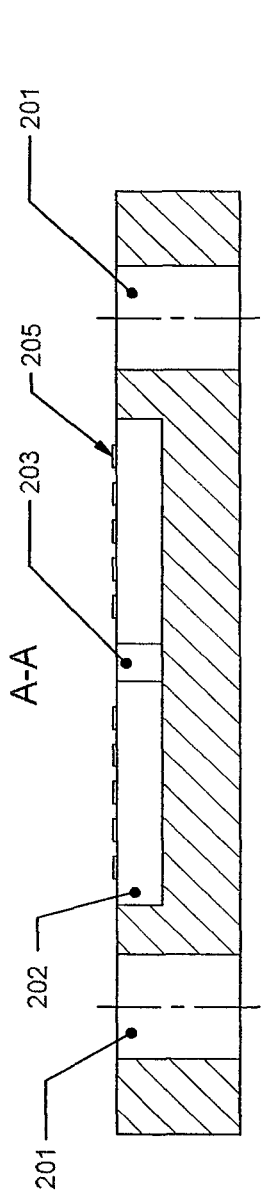
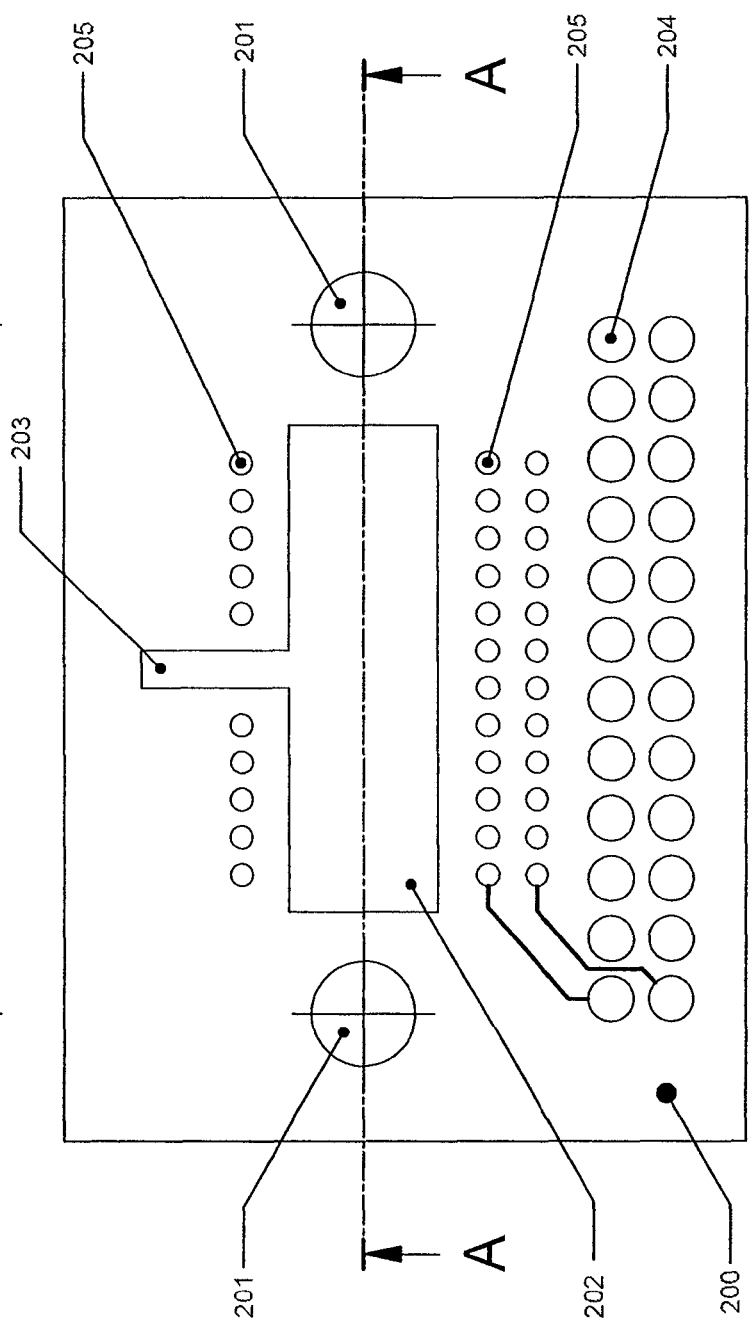
FIG. 3A
FIG. 3B

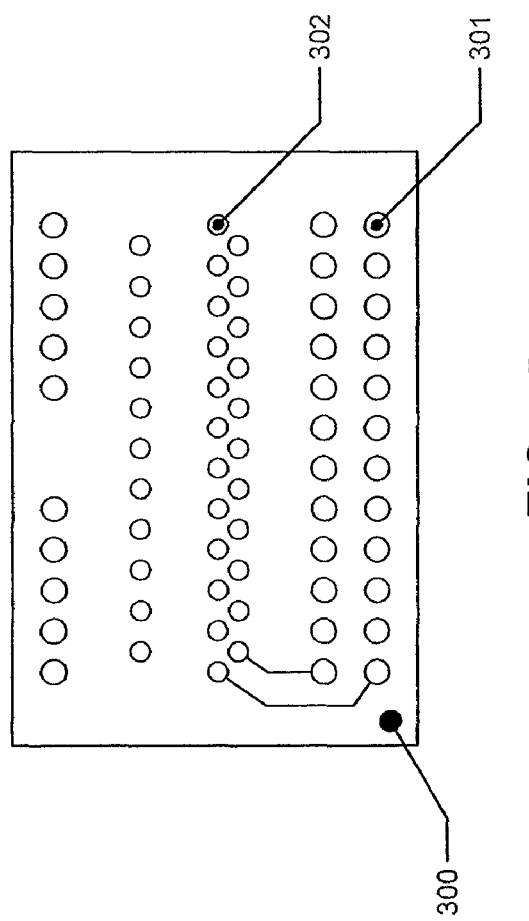
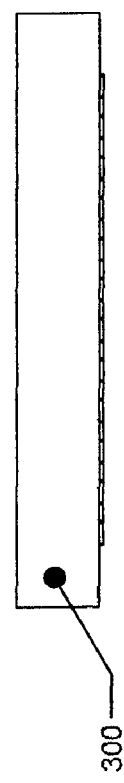

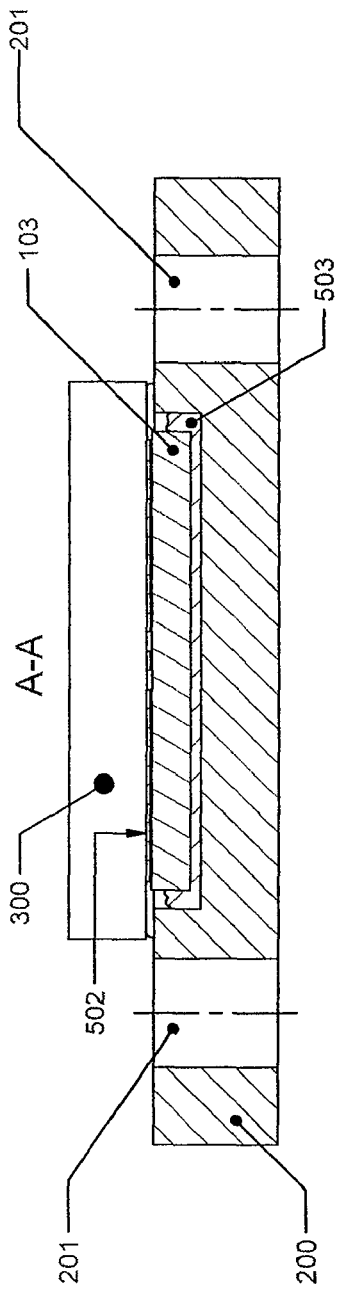
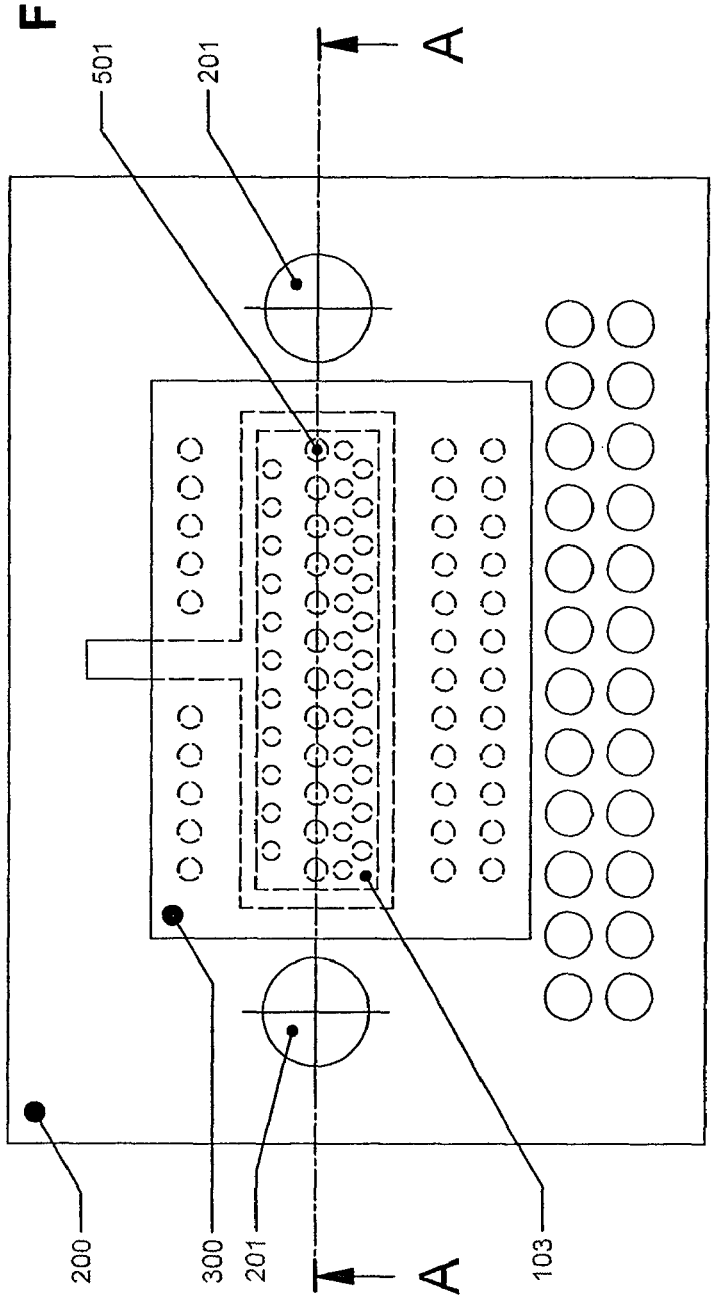
FIG. 5A
FIG. 5B

A-A

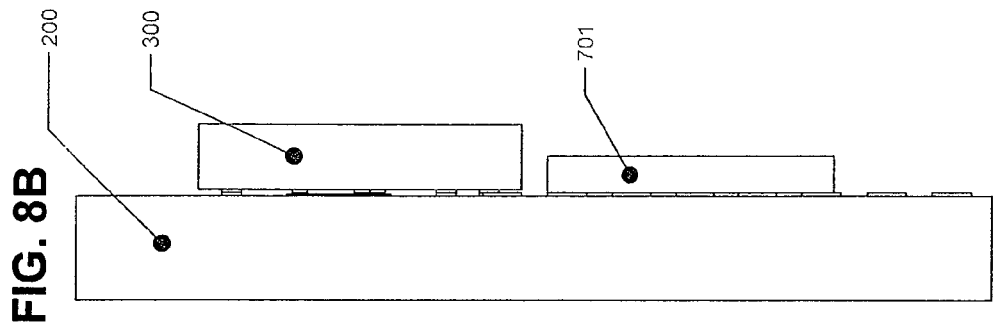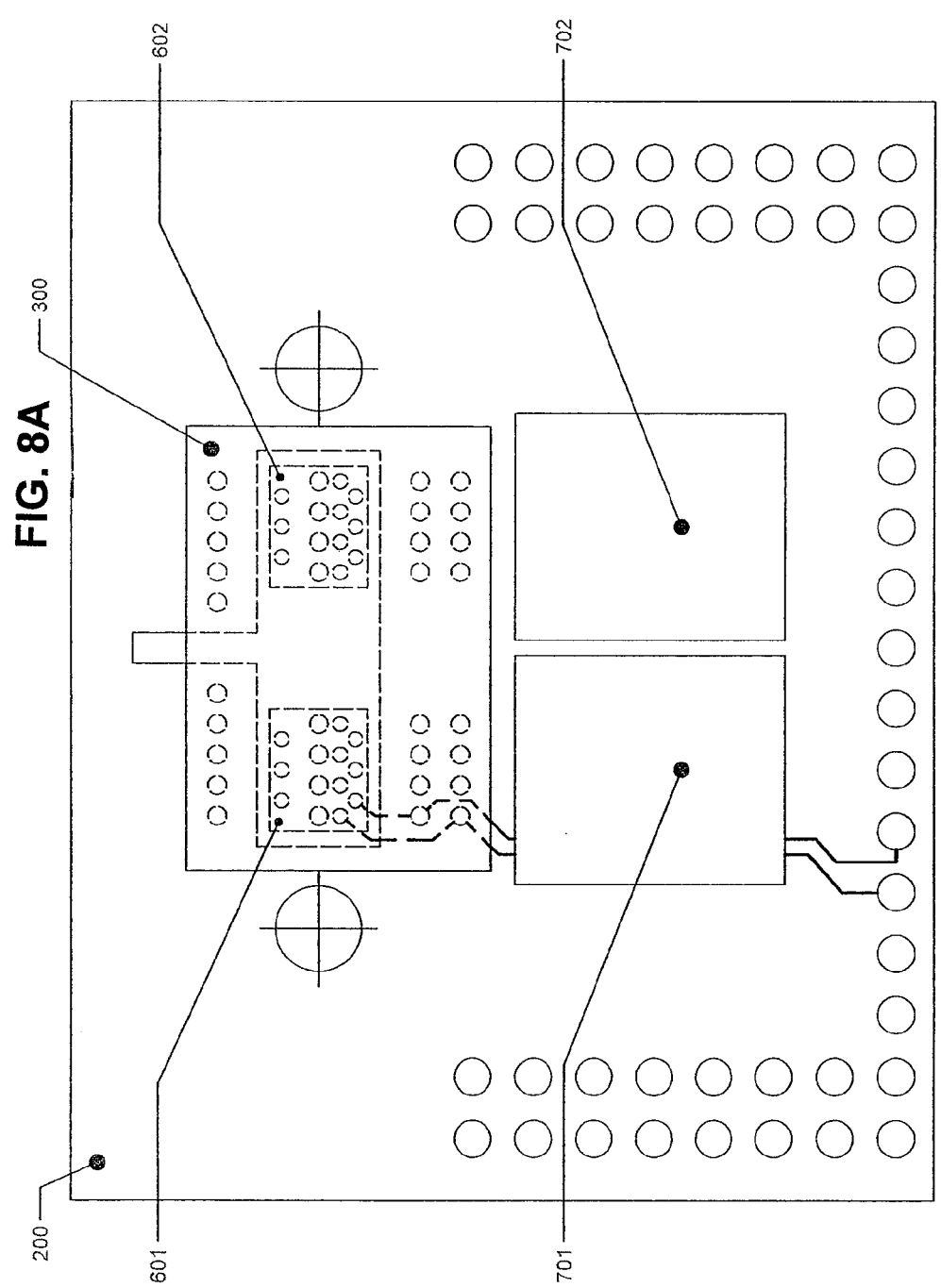

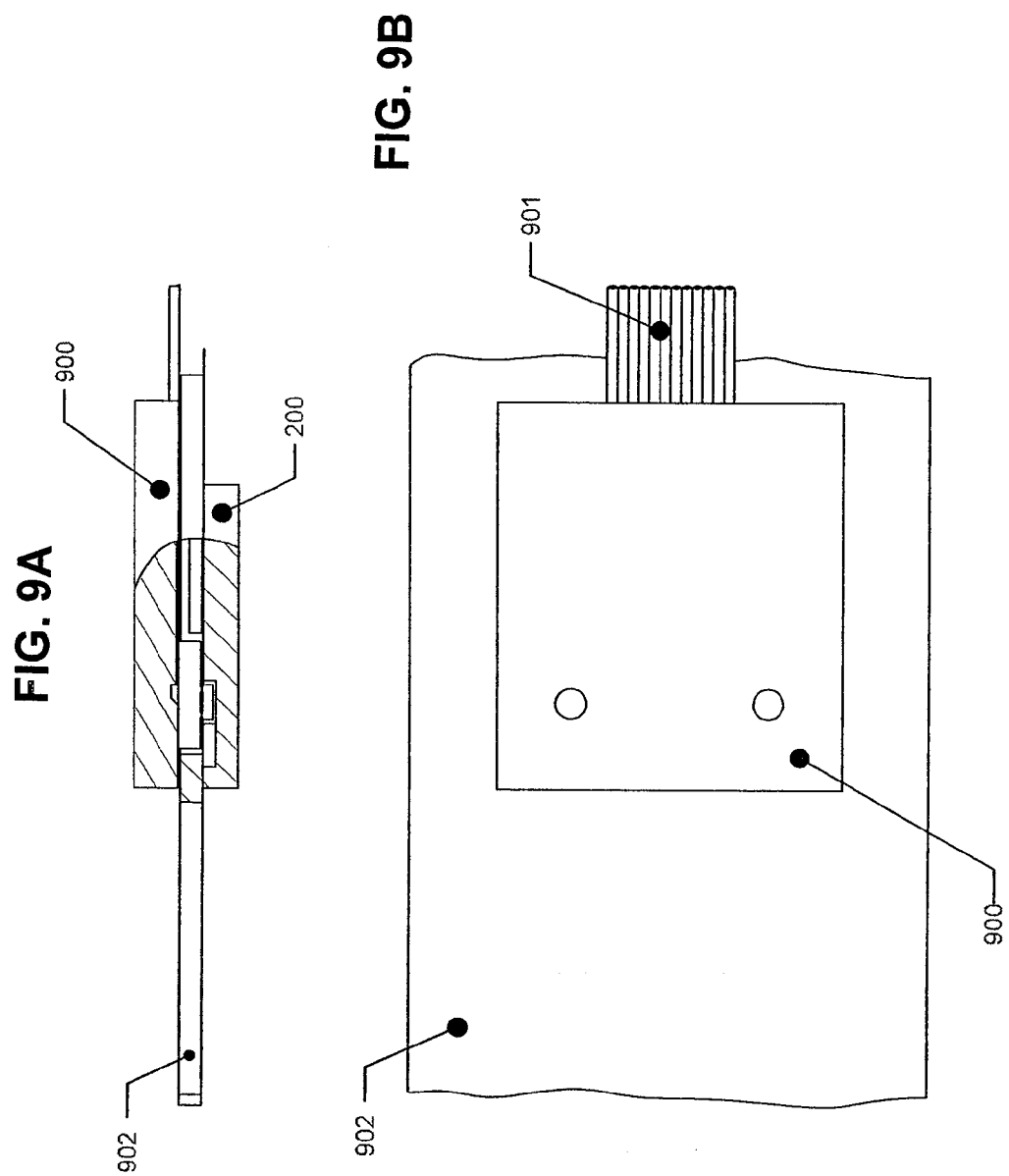

SELF-ALIGNED CARRIER ASSEMBLY FOR OPTICAL DEVICE SUPPORTING WAFER SCALE METHODS

FIELD OF THE INVENTION

The present invention relates to the field of optical devices. In particular, the invention relates to the design of a self-aligned carrier assembly for optical devices which supports wafer scale methods.

BACKGROUND OF THE INVENTION

There are numerous methods to produce an optical device including an optical die, such as a vertical-cavity surface-emitting laser (VCSEL). But in all cases they require four connections: the optical, the electrical, the thermal and the mechanical. Different applications require different approaches on how to balance these four connections.

When an optical device is produced, an optical die is mounted on and connected to a carrier. The mounting of an optical die to a carrier and coupling of light to optical fibres are both time consuming steps requiring micromechanical piece parts. Consequently, these steps are high cost steps in the production of an optical device.

FIG. 1 illustrates an optical device comprising a transparent glass carrier 101 with a metalized pattern 102 for electrical connection and pads for epi down attachment of an optical die 103. The light 104 passes through the glass substrate 101. The position of the optical die 103 with respect to the metal pattern of the carrier is determined by self-alignment. For example, surface tension in liquid phase solder joints 105 could be used.

FIG. 2 illustrates an optical assembly comprising of an optical die 103 attached to a silicon carrier 106 with a groove 107 for fibre alignment. At the end of the groove there is a metalized mirror 108 reflecting the light 90 degrees (45 deg mirror) from/to optical die 103 to fibre end face 109.

One way to address the cost problem is to apply wafer scale methods to produce an optical device. Using a wafer scale method, a number of integrated circuits can be attached at the same time on a common slice of wafer. Once the fabrication process is complete, the wafer is divided into the individual devices.

However, each optical device needs to be tested prior to shipping. From a cost perspective, it is beneficial if the optical devices can be tested at the wafer scale stage (ie: before the wafer is divided into individual devices).

SUMMARY OF THE INVENTION

Embodiments of the present invention provide a self-aligned carrier design for an optical device supporting wafer scale methods for the assembly, the burn in and the HF electronic and optical testing. It is known that a silicon carrier (such as that illustrated in FIG. 2) is best suited for edge emitters and detectors and a glass carrier (such as that illustrated in FIG. 1) is best suited for surface emitters and detectors. Embodiments of the present invention provide a combination carrier of silicon and glass substrates.

An optical device produced in accordance with the teachings of the present invention includes a glass carrier with an optical die soldered to a silicon carrier. Broadly speaking, embodiments of the present invention combine the advantage optical transparency provided by a glass substrate with the advantage of a micromechanical structure for fiber alignment provided by a silicon substrate. Embodiments of the invention also provide a method of producing a combined glass and silicon carrier that provides a high level of self-alignment.

To effectively take advantage of a wafer scale assembly method, a number of optical dies are soldered to the glass carrier substrate. According to embodiments of the present invention, this is achieved by solder pads deposited onto the surface of the optical die such that self alignment is achieved by surface tension in liquid phase solder bumps using gaseous flux. Still on wafer level, the optical dies are subjected to test and burn in, the substrate is then diced to separate carriers (including dies), the approved assemblies are simultaneously attached to a silicon wafer by self alignment reflow of solder bumps (similar to the die attach to the glass substrate). In this way multiple dies on glass carriers can be soldered to a silicon wafer. Using such a wafer scale assembly permits a cost effective manufacturing method. Using a two-step method in accordance with the teachings of this invention provides a high level of self-alignment.

In an alternative embodiment, ICs can be assembled in parallel. The optical die on glass can be effectively tested (with ICs) and approved/rejected on silicon wafer level before dicing the silicon carrier into separate optical devices (optical die on glass soldered to a silicon carrier) The wafer scale method offers parallel assembly, handling and test which is cost effective.

Embodiments of the invention provide a simple, easily manufacturable, passively aligned method of coupling an optical device to a fiber or fiber array. Passive and self correcting alignment methods of the optical device provide for an efficient and simple device to be added onto already existing components thus making its incorporation into the manufacturing process a desirable goal.

Thus, according to one aspect, the invention provides a method for manufacturing an optical device, comprising: providing a glass substrate; attaching a number of optical dies on the glass substrate using self-alignment of AuSn solder bumps; mounting the glass carrier to a silicon carrier to form an optical device carrier assembly, using self-alignment of SnAg solder bumps; and dicing the optical device carrier assembly to form individual optical devices.

In another aspect, the invention provides a method for manufacturing an optical device, comprising: providing a glass substrate; attaching a number of optical dies on the glass substrate; mounting the glass carrier to a silicon carrier to form an optical device carrier assembly; and dicing the optical device carrier assembly to form individual optical devices.

In one embodiment, the step of attaching a number of optical dies comprises using self-alignment of AuSn solder bumps using gaseous flux at a first temperature. Preferably the first temperature is about 300 deg. C.

In one embodiment, the mounting step uses self-alignment of SnAg solder bumps using gaseous flux at a second temperature. Preferably the second temperature is abut 250 deg. C.

In one embodiment, the method comprises testing and burn in of the optical dies. The method may also comprise the step of dispensing of transparent underfill. The method may also comprise dicing individual optical device carrier assemblies prior to the step of mounting the glass carrier to a silicon carrier. Preferably the underfill is silicon rubber or epoxy.

The method may also comprise dispensing thermal compound between each optical die and the recess to assist the heat transfer to the silicon carrier.

In another aspect, the invention provides a carrier assembly of an optical device, the carrier assembly comprising in combination: a glass substrate with an optical die thereon; and a silicon carrier attached to the glass carrier. In one embodiment, the carrier assembly may comprise a recess in the silicon carrier to house the optical die. Possibly, the optical die is mounted to match the recess by self-alignment by surface tension in liquid phase solder at about 300 deg. C. There may also be a micromechanical structure for distribution of thermal compound in any gap between the optical die and the recess to assist the heat transfer to the silicon carrier. The micromechanical structure for distribution of the thermal compound may use capillary force. Preferably, the micromechanical structure is the recess in the silicon carrier.

In one embodiment, the glass substrate is soldered to the silicon substrate. The soldering of the glass substrate to the silicon substrate may use self-alignment by surface tension in liquid phase solder at about 250 deg. C.

In one embodiment, the carrier assembly may comprise a micromechanical structure on the silicon carrier for passive alignment to an external optical component. The micromechanical structures may include guide holes in the silicon substrate.

Cost and efficiency are improved by using a wafer scale assembly method. By providing solder pads deposited onto the surface of the optical die, self alignment is achieved by surface tension in liquid phase solder bumps using gaseous flux. In this way, a number of optical dies can be soldered to the glass carrier substrate and still achieve a high level of self-alignment accuracy. Using reflow of solder bumps also permits simultaneous attachment of optical dies on the glass substrate to the silicon substrate.

Other aspects and advantages of embodiments of the invention will be readily apparent to those ordinarily skilled in the art upon a review of the following description.

BRIEF DESCRIPTION OF THE DRAWINGS

Embodiments of the invention will now be described in conjunction with the accompanying drawings, wherein:

FIGS. 1 and 2 each illustrate an optical device as known in the art;

FIGS. 3A and 3B illustrates a silicon micromechanical carrier in accordance with the teachings of the present invention;

FIGS. 4A and 4B illustrates a glass carrier in accordance with the teachings of the present invention;

FIGS. 5A and 5B, illustrates assembly of the silicon carrier of FIGS. 3A and 3B to the glass carrier of FIGS. 4A and 4B to form an optical device in accordance with the teachings of this invention;

FIGS. 8A and 8B illustrates alternative embodiments of optical devices with an IC chip set in accordance with the teachings of this invention;

FIGS. 9A and 9B shows an optical device including IC and a ribbon fiber connection.

Figure 6A:
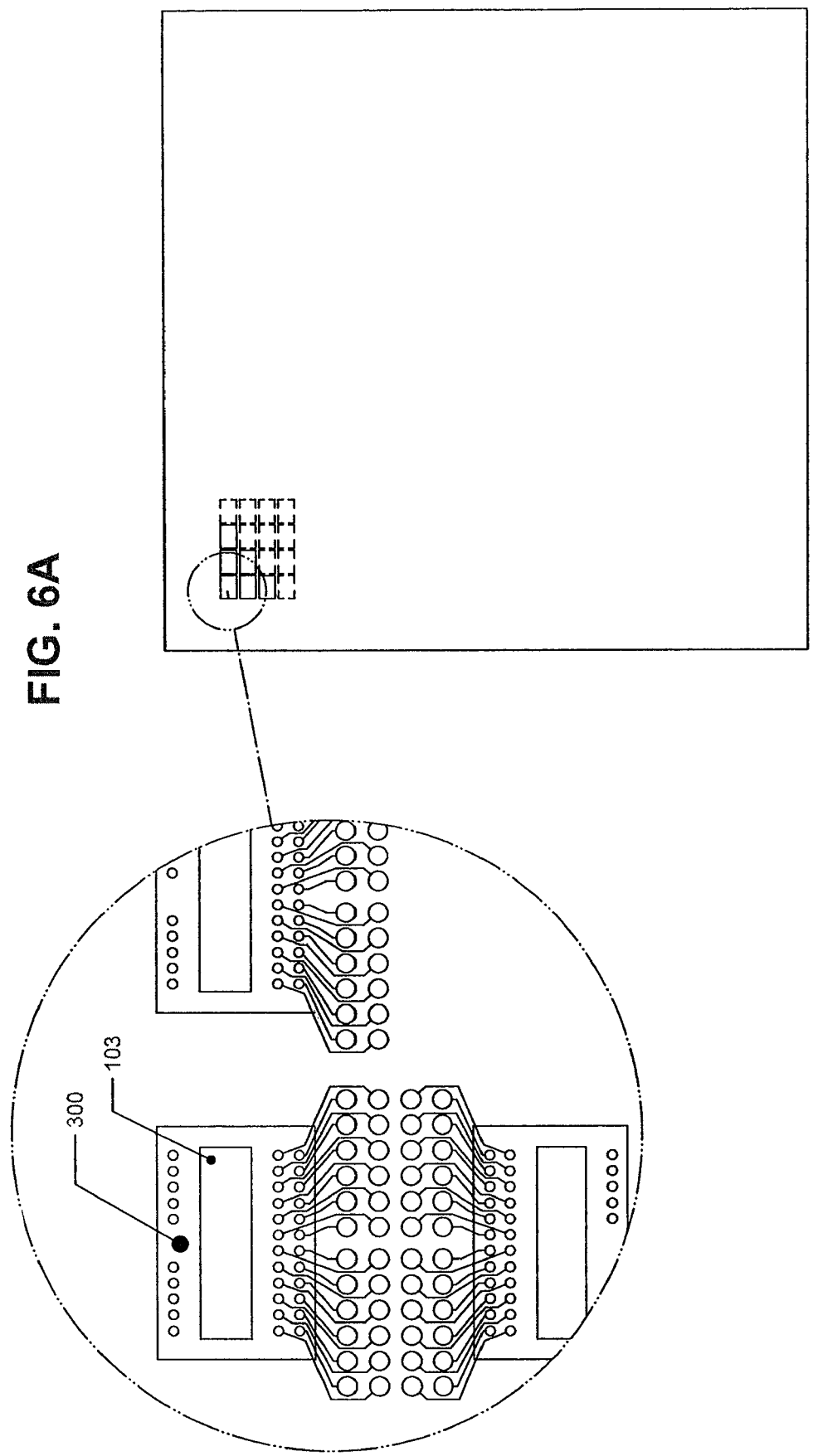
FIG. 6a shows the wafer scale assembly of optical die to glass substrate

This invention will now be described in detail with respect to certain specific representative embodiments thereof, the materials, apparatus and process steps being understood as examples that are intended to be illustrative only. In particular, the invention is not intended to be limited to the methods, materials, conditions, process parameters, apparatus and the like specifically recited herein.

DETAILED DESCRIPTION OF THE DISCLOSED EMBODIMENTS

Embodiments of the invention provide an optical device comprising both a silicon micromechanical carrier 200 (illustrated in FIG. 3) and a glass carrier 300 (illustrated in FIG. 4). The combination of silicon and glass combines the advantages of the two alternatives (micromechanics from silicon and transparency for glass). The glass carrier 300 and silicon carrier 200 are soldered together during the fabrication process, as will be detailed below.

Generally silicon offers excellent properties as carrier for optical die and electrical circuits. The properties include high definition micromechanical structuring by dry etching; high definition metal patterning by a combination of metal deposition and lithography (electrodes) and electroplating (solder bumps); high accuracy between mechanical structures and the metal pattern (approx. 1 micron); good thermal properties, ie: thermal conductivity; good HF properties; and batch handling and parallel processing supporting low piece part cost.

Referring to FIG. 3, the silicon carrier 200 comprises guide holes 201 and a recess 203. Guide holes 201 facilitate alignment and mechanical matching to a fibre holding fixture (not shown). The guide holes 201 are defined with micron range accuracy to align an optical system. Guide holes 201 are used together with a mating structure (such as a guide pin) to position a lens or a fibre fixture, thereby achieving high precision passive assembly. An optical element (not shown) with a mechanical feature (such as mating pins) matching the silicon carrier guide holes 201 can be used to passively couple light into optical fibres.

A recess 202/203 is provided for housing the optical die 103. This recess 203 allows the solder joint height between glass carrier 300 (FIG. 3) and silicon carrier 200 to be kept low, which permits high accuracy for the self-alignment soldering step as described in detail below.

The recess 203 also serves for transporting (by capillary forces) thermal compound to the recess 202. A high thermal conductivity polymer is added to any gap between the recess 202 in the silicon carrier and the optical die to assist in thermal conductivity to the silicon carrier Electrical connection pads 204 are also provided on the silicon carrier 200 at the periphery thereof (alternatively including solder pads). The electrical connection pads are compatible with standard well-established flip-chip ASIC assembly, for connecting the silicon carrier to the outside world, for example to a printed circuit board. Electrical connections for connecting to a glass carrier, including pads for solder joints 205. It should be noted that an ASIC can be placed in this path and connected by solder bumps.

Referring to FIG. 4, the glass carrier 300 comprises electrical connection pads 301 at the periphery (alternatively including solder bumps compatible with standard and well established flip chip ASIC attachment methods) for connecting the glass carrier 300 to the silicon carrier 200. Electrical connections 302 for connecting to an optical die including pads for solder joints are also provided. The positional matching of the optical die pads and the glass substrate pads is a result of self-alignment by surface tension in liquid phase solder. These solder bumps are deposited onto the surface of the optical die. In this way, hundreds of dies can be soldered in parallel as is discussed below.

The glass substrate 300 is also transparent, to let the light pass through. This allows for epi-down attachment of the optical die 302, which helps to achieve and keep the overall positional accuracy.

For such an optical carrier in accordance with the teachings of this invention to be feasible, it should be cost effective to manufacture. Thus embodiments of this invention also contemplate using wafer-scale methods. In this way a number of optical devices can be produced simultaneously. One method in accordance with the teachings of this invention is described below.

The present inventors also struggled with how to attach the optical die (such as surface emitters and detectors) to the glass substrate and the glass substrate to the silicon substrate with sufficient accuracy, that is the position of the optical die with respect to the micromechanical structures on silicon (guide holes). Broadly speaking in accordance with the teachings of this invention, this alignment is based on a two step "self alignment by surface tension in liquidous solder bumps". As will be described in detail below, this can be accomplished by a soldering hierarchy, first temperature for optical die to glass (AuSn, approx 300 deg C.) second temperature for glass to silicon (AgSn, approx 250 deg C.).

Referring to FIG. 5, the assembly of the glass substrate 300 to the silicon substrate 200 by soldering is detailed. Due to high precision lithographic wafer patterning and self alignment by surface tension force in liquid phase solder, the relative positional accuracy between the active area 501 of the optical die 103 and the silicon guide holes 201 is very good. The present inventors have achieved accuracy of about 5 micron.

An optical element (not illustrated) with a mechanical feature (such as mating pins) matching the silicon carrier guide holes, can be used to passively couple light into optical fibres.

For the assembly process, the high level of integration put high requirements on yield for this assembly to be applicable from a cost perspective. To overcome this obstacle a wafer-based assembly method is used. One contemplated method in accordance with the teachings of this invention is described below in conjunction with FIGS. 6a, 6b and 10.

Referring to FIG. 6a, the first step is simultaneous substrate level attachment of optical dies 103 on a glass substrate 300 to form individual "die-on-glass-carriers". (Step 500 in FIG. 10). This step is based on self-alignment on AuSn solder bumps using gaseous flux at a first suitable temperature at around 300 deg. C. Hundreds of dies can be soldered in parallel. The glass substrate has sacrificial surfaces to be wasted at dicing. These surfaces have connection pads for DC testing and burn in. This arrangement facilitates the probing since the pitch between pads can be larger than on the carrier. Furthermore, the carrier pad surface can have a solder bump, eg: SnAg, on which it is not suitable to probe.

The next step is dispensing of transparent underfill (such as silicon rubber or epoxy) 502 (seen in FIG. 5). This step is to protect the epi-side of the optical die 103 and secure the optical path between the die 103 and the glass substrate 300.

Figure 10:
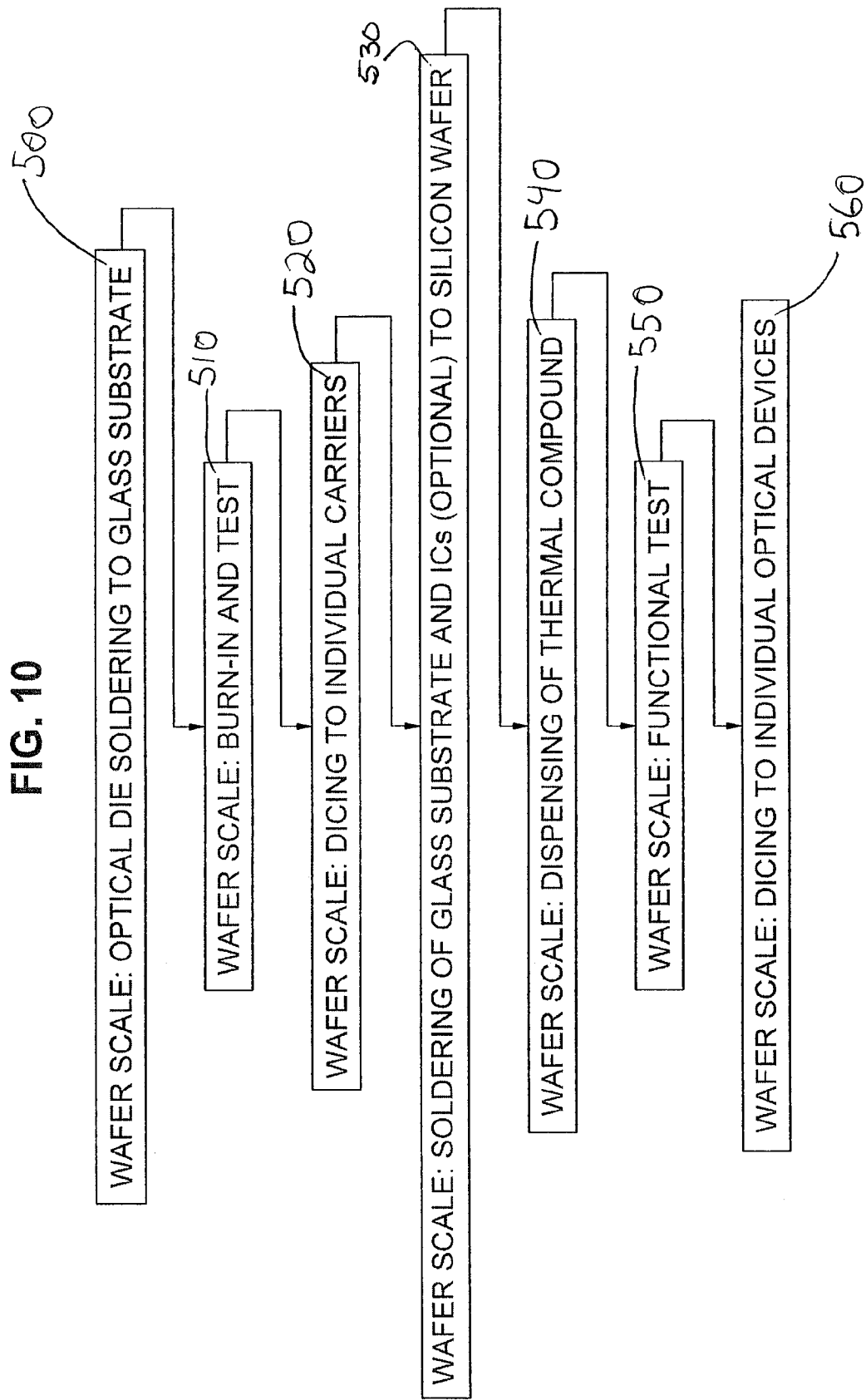
FIG. 10 is a flow chart of the fabrication steps for an optical device in accordance with the teachings of this invention.

The following step is substrate level DC test and burn in (step 510 in FIG. 10); and thereafter is the step of dicing into individual die-on-glass-carriers (step 520 in FIG. 10).

Figure 6B:
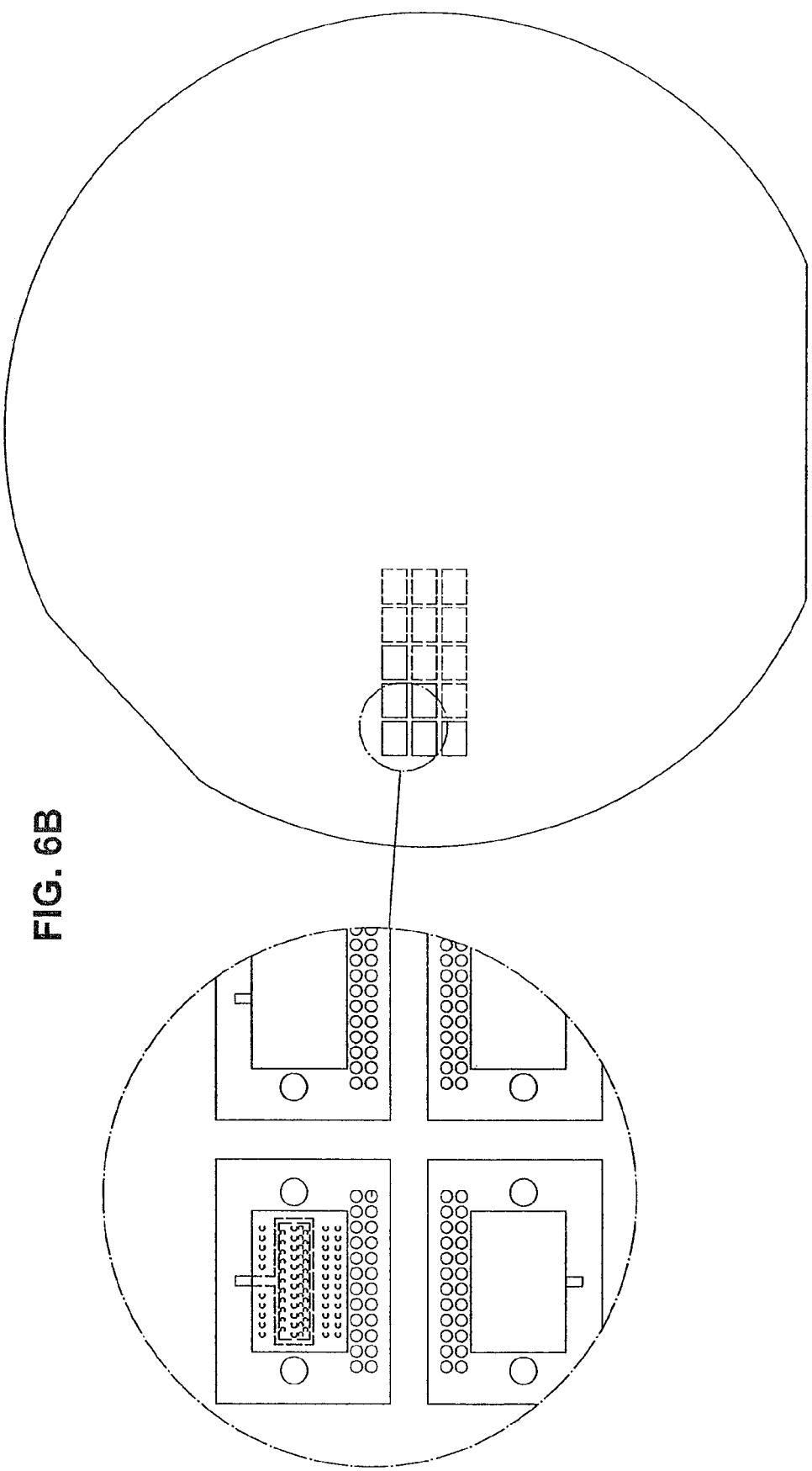
FIG. 6b shows the wafer scale assembly of glass carriers to silicon wafer

Referring to FIG. 6b, the following step is simultaneous wafer level attachment of approved die-on-glass-carrier on silicon (step 530 in FIG. 10). Approved die-on-glass-carriers are ones that have been approved by the substrate level DC test and burn in step. Wafer level attachment of approved die-on-glass-carriers is based on self-alignment on SnAg solder bumps using gaseous flux at a second suitable temperature of about 250 deg C. Hundreds of die-on-glass-carriers can be soldered in parallel.

Next is the step of dispensing of thermal compound (step 540 in FIG. 10). The gap between optical die 103 and the walls and bottom of the silicon recess 202/203 is filled with a high thermal conductivity polymer 503 (illustrated in FIG. 7) to assist the heat transfer to the silicon carrier 200.

Thereafter is wafer level HF testing (step 550 in FIG. 10); dicing into individual carrier assemblies (step 560 in FIG. 10), and attachment of approved carrier assemblies to PCB. The optical connection is then attached. This could be, for example, a cable assembly including fibre holder fixture. Then the complete pair of sub modules are tested, and the sub modules are assembled into the module casings. The final test is then performed.

Figure 7A:
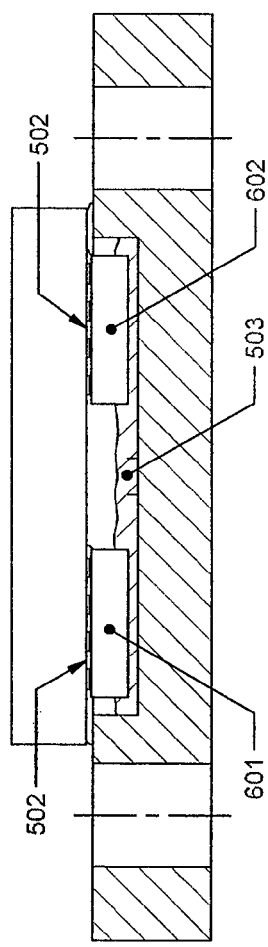
FIGS. 7A and 7B illustrates an alternative embodiment of an optical device without an IC in accordance with the teachings of this invention.
Figure 7B:
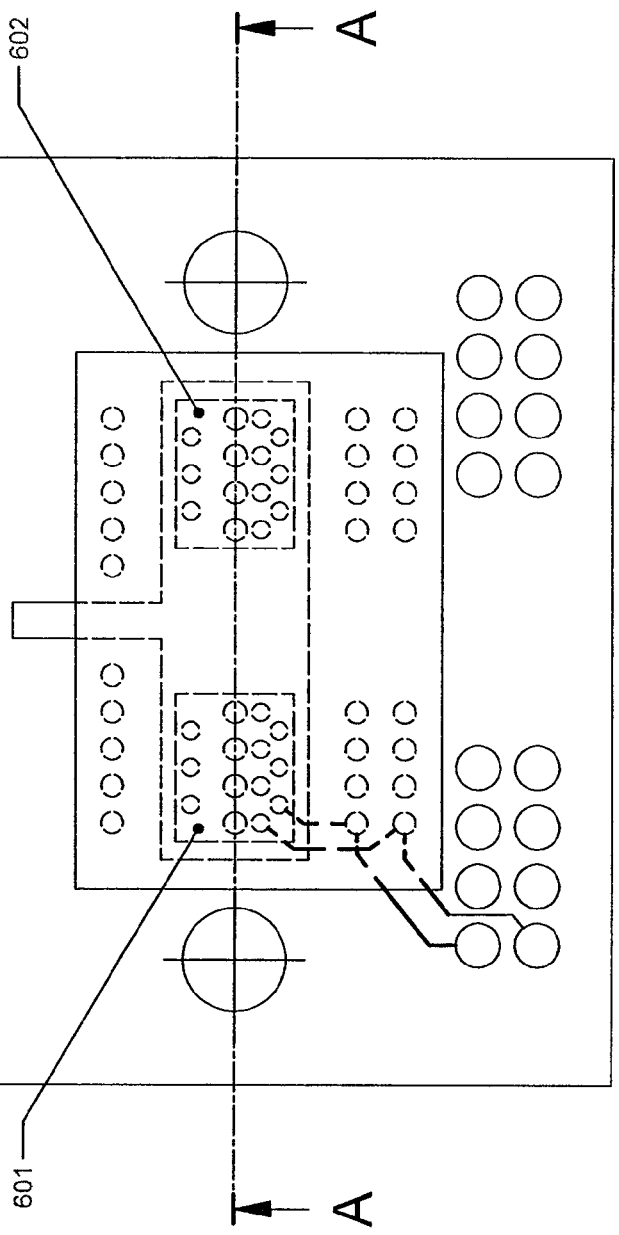

Preferred embodiments of the present invention are illustrated in FIGS. 7 and 8. FIG. 7 shows an array type design including two optical dies, one 4-channel transmitter 601 and one 4 channel receiver 602. FIG. 8 shows the same but with electronics added, one receiver ASIC 702 and one transmitter ASIC 701

FIG. 9 shows the assembly according to FIG. 7 or 8 with an optical arrangement 900 with a fibre ribbon 901 in place and connected to a printed circuit board 902. This arrangement in combination with a fibre-coupling fixture (as known in the art) offers a light path, which is from die to fibre tip, completely filled with a transparent polymer. This is beneficial in applications where there is a risk of contamination or condensed water on refractive surfaces.

Numerous modifications may be made without departing from the spirit and scope of the invention as defined in the appended claims.

What is claimed is:

1. An optical device, comprising:
   a glass substrate;
   an optical die soldered to the glass substrate to form a die-on-glass assembly;
   first solder bumps on the glass substrate to facilitate self-alignment by surface tension of the optical die to the glass substrate;
   a silicon substrate soldered to the die-on-glass assembly;
   a recess in the silicon substrate for receiving the optical die when the silicon substrate is soldered to the die-on-glass assembly;
   second solder bumps on the glass substrate to facilitate self-alignment of the silicon substrate to the die-on-glass assembly such that the optical die is accurately positioned within the recess; and
   a micromechanical structure on the silicon substrate to permit connection of the optical device to an external component;
   whereby the optical device exhibits both optical transparency through the glass substrate and micromechanical structuring from the silicon substrate.

2. The optical device of claim 1, wherein the first solder bumps on the glass substrate to facilitate self-alignment by surface tension of the optical die to the glass substrate are AuSn solder bumps.

3. The optical device of claim 1, wherein the second solder bumps on the glass substrate to facilitate self alignment of the silicon substrate to the die-on-glass assembly are AgSn solder bumps.

4. The optical device of claim 1, and further comprising a thermal conductivity polymer in any gap between the optical die and the recess to assist in heat transfer to the silicon substrate.

5. The optical device of claim 4, wherein the polymer uses capillary force to assist the heat transfer.

6. The optical device of claim 5, wherein the polymer is in the recess.

7. The optical device of claim 1, and further comprising transparent underfill to secure an optical path between the optical die and the glass substrate.

8. The optical device of claim 1, wherein the micromechanical structure includes guide holes in the silicon substrate.

9. The optical device of claim 1, wherein the external component is a printed circuit board.

* * * * *